United States Patent [19]

Nehl

[11] Patent Number: 5,377,175

[45] Date of Patent: Dec. 27, 1994

[54] STORAGE DEVICE FOR RECORDING MEDIA, PARTICULARLY COMPACT DISKS, MAGNETIC TAPE CASSETTES AND THE LIKE

[75] Inventor: Wolfgang Nehl, Waldachtal, Germany

[73] Assignee: Fischerwerke Artur Fischer GmbH & Co. KG., Waldachtal/Tumlingen, Germany

[21] Appl. No.: 964,372

[22] Filed: Oct. 21, 1992

[30] Foreign Application Priority Data

Oct. 25, 1991 [DE] Germany .................... 4135324

[51] Int. Cl.[5] .............. G11B 33/04; G11B 23/03; A45C 13/10; B65D 85/30
[52] U.S. Cl. ................ 369/75.1; 369/292; 206/1.5; 206/444
[58] Field of Search .............. 369/36, 39, 291–292, 369/75.1, 77.1; 360/96.5, 99.06, 133, 92; 206/1.5, 309, 387, 444; 312/9.17, 9.26, 9.28, 9.11, 9.47, 9.57, 323

[56] References Cited

U.S. PATENT DOCUMENTS

| Re. 30,184 | 1/1980 | Ackeret | 312/9.57 |
|---|---|---|---|
| 4,142,730 | 3/1979 | Hynd et al. | 369/291 |
| 4,396,963 | 8/1983 | Wright | 360/99.06 |
| 4,580,182 | 4/1986 | Persiani | 360/132 |
| 4,791,511 | 12/1988 | Davis | 369/291 |
| 4,875,584 | 10/1989 | Ackeret | 206/387 |
| 4,935,895 | 6/1990 | Ohyama | 360/96.5 |
| 4,976,350 | 12/1990 | Fukumoto | 206/387 |
| 5,141,103 | 8/1992 | Stephan | 206/387 |

FOREIGN PATENT DOCUMENTS

| 0225766 | 6/1987 | European Pat. Off. |  |
|---|---|---|---|
| 1131026 | 6/1962 | Germany | 312/9.26 |
| 8620007 | 7/1986 | Germany |  |
| 8802795 | 3/1988 | Germany |  |

*Primary Examiner*—John H. Wolff
*Assistant Examiner*—George J. Letscher
*Attorney, Agent, or Firm*—Michael J. Striker

[57] ABSTRACT

The storage device includes slider members, each having a resilient clasp element for receiving and holding a recording medium housing. Each of the slider members is spring-loaded and slidable between a storage position in the storage device housing and an unloading position contained completely within the housing. In the unloading position a recording medium housing held by the slider member projects from a housing opening in the storage device housing so that it can be removed from the slider member but the slider member need not be pushed back. The storage device has a locking device for each slider member including a resilient blade attached to the storage device housing at one end and having a latching element at the other end so that, when a recording medium housing is put into a housing opening and received by a slider member in the unloading position, it can be pushed into the housing and secured in the storage position. An unlocking device including a push button mounted on the housing next to each housing opening is provided so the slider member can be released from the storage position to slide into the unloading position simply and reliably.

7 Claims, 3 Drawing Sheets

STORAGE DEVICE FOR RECORDING MEDIA, PARTICULARLY COMPACT DISKS, MAGNETIC TAPE CASSETTES AND THE LIKE

BACKGROUND OF THE INVENTION

The present invention relates to a storage device for recording media, particularly compact disks, magnetic tape cassettes and the like.

A storage device for recording media is known comprising a slider member slidable into a storage position against a spring force, which is held by a locking device in a storage (locked) position. The locking device can be unlocked by a push button to bring the slider member into a unloading position projecting from the front side of the storage device, in which it can receive a recording medium housing, i.e. a disk housing, tape cassette housing or the like.

Storage devices for recording media such as music tape cassettes, compact disks or the like are known, in which one or more slider member are located in a storage device housing which is open on one side. Each slider member can hold a recording medium housing, i.e. including a music tape cassette, a compact disk or the like, and is slidable against a spring force in the housing. The slider member is held in the pushed-in position by a locking device and can be unlocked again by pressing a push button. The unlocked slider member is moved by action of the spring force in the direction of the housing opening so that the slider member with the recording medium housing on it projects from the front side of the housing far enough so that the recording media unit can conveniently be taken from it.

In the known storage device in the unloading position a portion of the slider member projects from the housing. The locking device in the slider member is also moved from the interior of the housing to the outside. After removal of the recording medium housing the slider member must again be put in its locked storage position, so that the adjacent slider member are again accessible. If now, for example, a compact disk housing is to be put in the storage device, before the compact disk housing can be deposited on the slider member and the slidable holding pushed back into the storage device, the slider member must be put in the unloading position by operation of the push button.

SUMMARY OF THE INVENTION

It is an object of the present invention to provide a storage device which does not have the above described disadvantages.

It is an object of the present invention to provide a storage device of the above-described type in which the slider member does not need to be pushed back into the storage position after the recording medium housing, e.g. containing compact disk or the like, is taken from it.

According to the invention, the storage device for recording media comprises a storage device housing with a front side; at least one slider member held slidably in the storage device housing so as to be slidable into a storage position against a spring force and being formed to hold a recording medium housing; a locking device for each of the slider members for locking the slider members in the storage position, the locking device including means for engaging and holding the recording medium housing and unlocking means including a push button for releasing the slider member from the storage position so that the slider member can slide into an unloading position with the recording medium housing projecting from the front side. The slider member and the locking device associated therewith are structured so that each of the slider members is contained within the housing in the unloading position as well as in the storage position.

The locking device is advantageously located in the storage device housing and engages in the storage position in a locking recess or groove or the like in the recording medium housing held on the slider member. If the locking device is now released, the slider member located in the storage device housing slides under action of the spring force and the recording medium housing on it, e.g. a Minidisk housing, is forced out of the front side of the housing. The recording medium housing can then be removed from the slider member. However the slider member in the unloading position remains completely contained within the housing of the storage device. After removal of the Minidisk housing in the storage device of the invention it is no longer necessary to push the slider member back into the housing. As soon as a recording medium housing is put on the empty slider member again, it is pushed into the storage device against the spring force of a slider spring engaged with the slider member until the locking device acts to lock the slider member in the storage position. Furthermore the slider member does not need to be made accessible first prior to depositing a recording medium housing on it, as is the case in the known storage device. The storage device of the invention has an additional advantage, because the slider member remains contained within the housing of the storage device. Then the housing openings on the front panel of the housing can be as small as the recording medium housing, which is comparatively small in the case of a compact disk housing. An opening big enough for a protruding slider part is not necessary in the storage device of the invention, so that a largely closed front panel can include the openings for the recording medium housing.

It is particularly advantageous to provide at least one resilient clasp element on each slider member, which secures a recording medium housing on the slider member against unintended slipping during motion. The resilient clasp elements can engage resiliently in notches in the housing of the recording medium. Thus also horizontal or level orientation of the storage device is possible without a problem. When the slider member is moved into the unloading position, the resilient clasp element prevents catapulting of the recording medium housing from the storage device.

In an advantageous embodiment of the invention a release element is provided on each slider member so that the locking device is held open at least over a portion of the motion path of the slider member during motion of the slider member from the unloading position to the storage position. By this feature contact between a latching element of the locking device and the housing of the recording medium is avoided during insertion and removal of the recording medium housing. Otherwise during frequent sliding in and out of the recording medium housing scratch marks could arise on the recording medium housing and wear on the latching element could make the locking device eventually unusable.

Advantageously the release element is a lug extending from the slider member in the direction of the housing opening and attached to the slider member, which engages slidably over a resilient blade fixed in the housing on whose free end a latching element of the locking device is located. As long as the lug is located over the resilient blade, the latching element of the locking device is pressed down so that and engagement of the latching element with the recording medium housing is avoided. When the resilient blade does not hold the latching element down, by the spring action of the resilient blade the latching element rises, engages and holds the recording medium housing in the storage device housing and locks the slider member in the storage position.

In a preferred embodiment of the invention a resilient wire held fixed in the storage device housing is connected laterally to the latching element and can be depressed by an inclined surface formed on the push button when the push button is pressed in so that the latching element is deflected into the unlocked position.

BRIEF DESCRIPTION OF THE DRAWING

The objects, features and advantages of the present invention will now be illustrated in more detail by the following detailed description, reference being made to the accompanying drawing in which:

FIG. 4 is a detailed bottom plan view of a locking device of the storage device shown in FIG. 1 in a state with the push button pushed in;

DETAILED DESCRIPTION OF THE PREFERRED EMBODIMENTS

Figure 1:
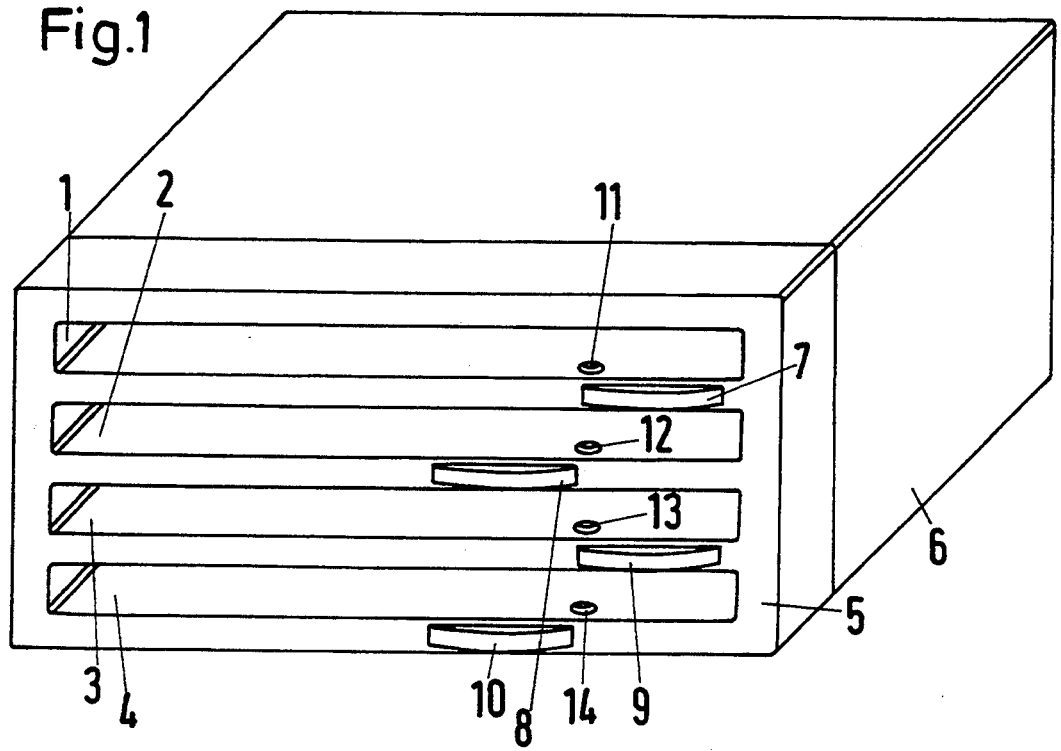
FIG. 1 is a perspective view of a storage device for Minidisks according to the invention.

The storage device shown in FIG. 1 has four housing openings 1 to 4, in each of which a Minidisk housing 23 containing a so-called Minidisk is insertable. A front panel 5 closes the housing 6 on a front side of it. Push buttons 7 to 10 for operation of the latching elements 11 to 14 of the locking device shown in the drawing are arranged staggered on the front panel 5. In FIG. 1 the latching elements 11 to 14 are however shown with the locking device in a locking state protruding in the interior of the housing. With a recording media (Minidisk) housing not pushed in the storage device housing 6 the slider members, which are not shown in FIG. 1 in the storage device housing 6, are in the unloading position and actually press the latching elements 11 to 14 downward. A recording medium (Minidisk) housing now, for example housing 23 shown in FIG. 2, can be pushed into the housing opening 1 far enough until latching element 11 engages in it—without that happening, the latching element 11 rests underneath the recording medium housing 23.

Figure 2:
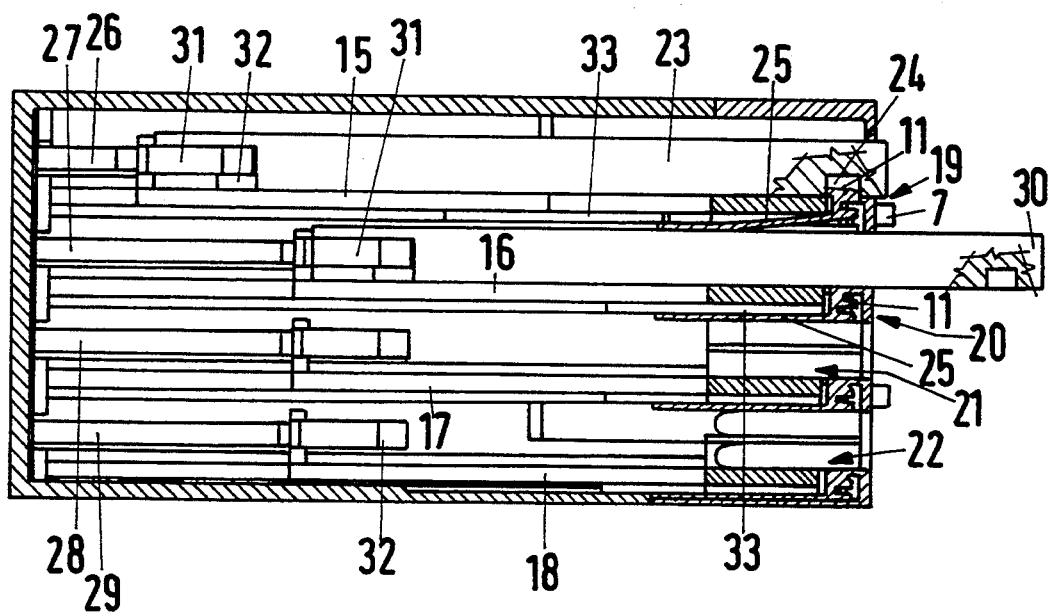
FIG. 2 is a longitudinal cross-sectional view of the storage device shown in FIG. 1.

FIG. 2 shows that the slider members 15 to 18 cooperate with the associated locking devices 19 to 22.

A Minidisk housing 23 (the recording medium housing) rests and is held on the slider member 15, which is located in the storage position as shown in FIG. 2. The latching element 11 is in the locking state and engages in a recess 24 in the Minidisk housing 23. The latching element 11 is located at the free end of resilient blade 25 held fixed in the housing and is moved downward by pressing on the push button 7.

When the push button 7 is operated, a slider spring 26 urges the slider member 15 into an unloading position, which the slider member 16 shown in FIG. 2 already has reached. In this unloading position the Minidisk housing 30 held on the slider member 16 clearly protrudes from the front panel 5 and can be conveniently removed from it. A resilient clasp element 31 prevents the Minidisk housing 30 from being catapulted from the storage device as it is moved from the storage position to the unloading position. The resilient clasp element 31 engages in notches 32 in the Minidisk housing 30 provided for that purpose and is attached to the slider member.

Lugs 33 directed toward the locking devices 19 to 22 are attached to the slider member 15 to 18. The lug 33 of the slider member 16 presses the resilient blade 25 downward in the unloading position so that the latching element 11 of the locking device 20 does not contact the bottom of the Minidisk housing 30.

Since the resilient blade 25 is upwardly inclined in the locking position, as is shown in FIG. 2 with the locking device 19, pushing the slider member 15 in the direction of the unloading position a short distance already results in depression of the resilient blade 25 and thus a return of the latching element to the position shown in locking devices 20 to 22.

When a Minidisk housing is put in the storage device, the associated slider member is pushed back against the spring force of the appropriate one of the slider springs 26 to 29 into the storage(locked) position, so that the associated latching element 11 locks in the recess 24 of the Minidisk housing.

Figure 3:
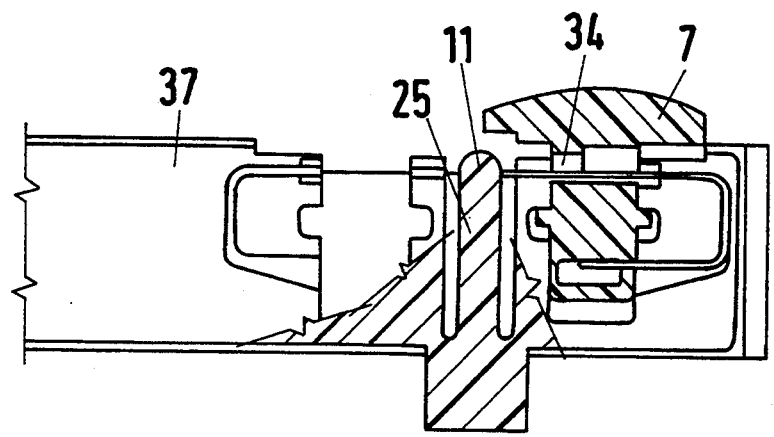
FIG. 3 is a detailed bottom plan view of a locking device of the storage device shown in FIG. 1 in the resting state.
Figure 4:
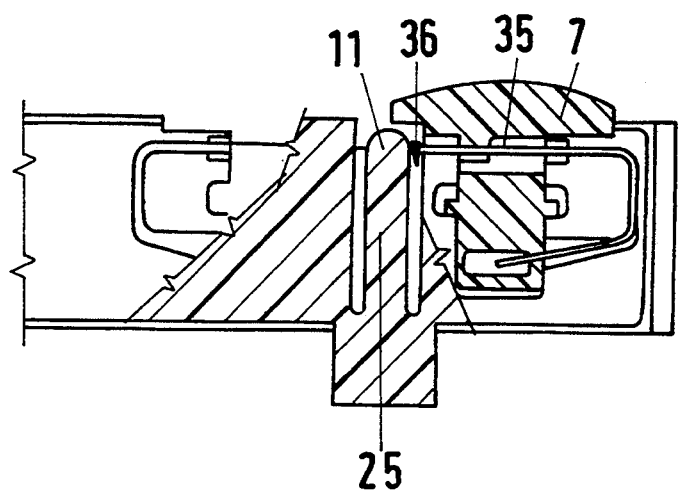

In FIGS. 3 and 4 details of the locking device 19 are seen from below. The push button 7 is shown in the rest position in FIG. 3, while in FIG. 4 the push button 7 is depressed. A slanting surface 34 is provided on the push button 7, which in the position shown in FIG. 4 deflects a resilient wire 35 from the plane of the figure. Because of that, simultaneously the latching element 11 attached to the end 36 of the resilient wire 35 is moved out from the plane of the figure. The latching element 11 then is moved into the unlocked position.

The base plate 37, in which the locking device 19 is located, is formed so that the push button 7 can be located right or left of the latching element 11.

Figure 5:
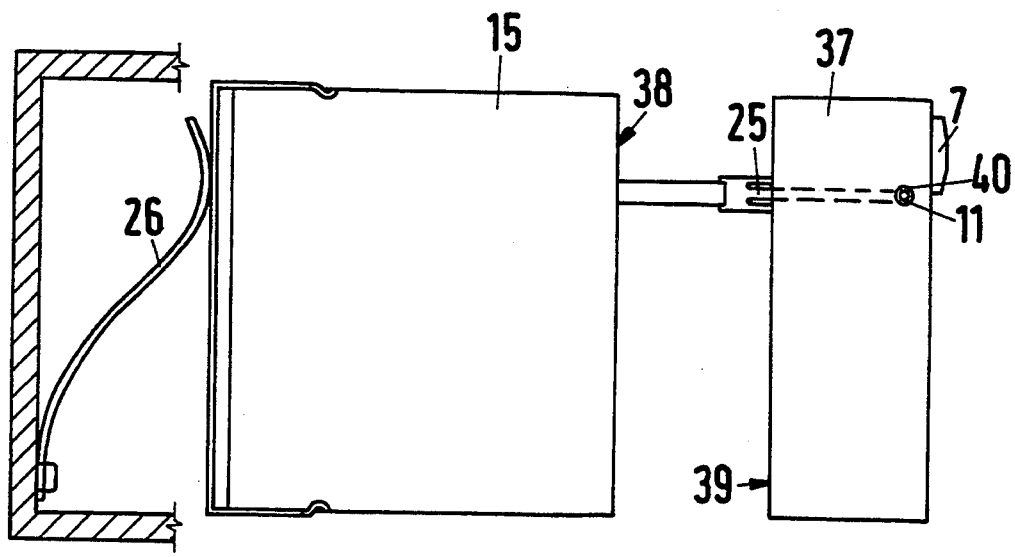
FIG. 5 is a plan view showing the principal arrangement of the slider member held in the storage device and the locking device.

FIG. 5 shows a simplified plan view of the preferred embodiment of the storage device in the vicinity of the slider member 15. The slider spring 26 contacts on the rear side of the slider member 15 and urges it from the locked or storage position to the unloading position. The unloading position is reached as soon as the slider member 15 contacts with its front edge 38 on the rear side 39 of the base plate 37. The lug 33 slides over the resilient blade 25 and presses this down together with the latching element 11 attached to it. In the locking configuration the latching element 11 projects out from a base plate opening 40 in the base plate 37.

Figure 6:
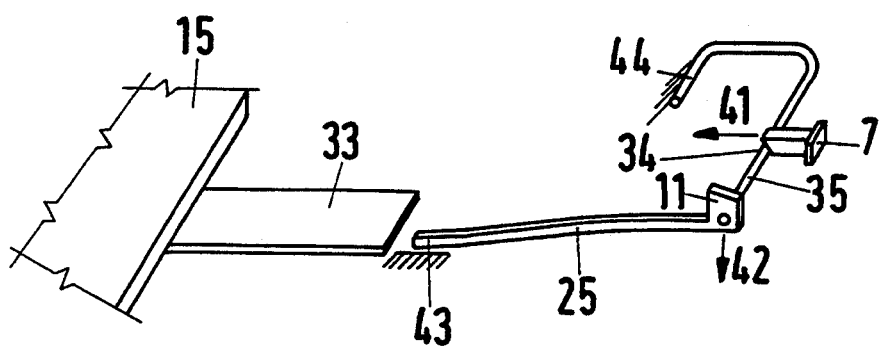
FIG. 6 is a perspective view of the locking device and the slider member showing the operation of the storage device.

In FIG. 6 the operation of the locking device 19 is particularly clearly illustrated. The inclined surface 34 and its operation are particularly easy to understand from this figure. If the push button 7 is moved in the direction of the arrow 41 in FIG. 6, the inclined surface 34 forces the resilient wire 35 downward. The latching element 11 is deflected down because of that in like measure in the direction of the arrow 42. Thus the latching element 11 is moved into the unlocked configuration.

The resilient blade 25 is held fixed at its end 43 and the resilient wire 35 is held fixed at its end 44 in the storage device housing 6.

It will be understood that each of the elements described above, or two or more together, may also find a useful application in other types of constructions differing from the types described above.

While the invention has been illustrated and described as embodied in a storage device for recording media, particularly magnetic tape cassettes, compact disks and the like, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed is new and desired to be protected by Letters Patent is set forth in the appended claims.

I claim:

1. Storage device for recording media contained in recording medium housings, said storage device comprising
   a storage device housing having a front panel provided with at least one storage device housing opening through which a recording medium housing containing a recording medium is insertable into and removable from said storage device housing,
   a slider member provided in said storage device housing for each of said storage device housing openings, wherein each of said slider members is provided with means for receiving, holding and carrying one of said recording medium housings, each of said slider members is spring-loaded so as to be urged from a storage position in said housing to an unloading position in said housing and each of said slider members is contained completely within said storage device housing in said unloading position;
   locking means associated with each of said slider members for holding and securing said slider member associated therewith in said storage position when said slider member is holding one of said recording medium housings; and
   unlocking means associated with each of said locking means for releasing said locking means when said slider member associated with said locking means is in said storage position so that said slider member can move from said storage position to said unloading position contained within said storage device housing;
   wherein each of said locking means includes a resilient blade attached to said storage device housing and having a free end and an upwardly protruding latching element at said free end, said resilient blade being positioned so that said latching element is engageable with one of said recording medium housings, when said recording medium housing is held on said slider member associated with said locking means and said slider member is in said storage position; and each of said unlocking means comprises a release element extending from said slider member associated with said locking means toward said storage device housing opening and positioned, so that said release element holds said resilient blade away from said recording medium housing at least over a portion of a motion path of said slider member between said storage position and said unloading position so that said latching element is not engaged with said recording medium housing; a resilient wire having one end connected to said latching element and another end connected to said storage device housing; and a push button mounted slidably in said storage device housing and having an inclined surface engageable laterally against said resilient wire when said push button is pushed so as to hold said latching element out of engagement with said recording medium housing when said slider member holding said recording medium housing is in said storage position, so that said slider member holding said recording medium housing can move from said storage position to said unloading position.

2. A storage device according to claim 1, wherein each of said means for receiving, holding and carrying comprises a resilient clasp element so that, when the slider member having said resilient clasp element holds one of the recording medium housings, said recording medium housing so engaged is held by said resilient clasp element so as to prevent unintentional sliding from said storage device housing during motion of said slider member holding said recording medium housing from said storage position to said unloading position but to allow removal of said recording medium housing from said storage device housing when said slider member holding said recording medium housing is in said unloading position.

3. A storage device according to claim 2, wherein each of said recording medium housings comprises a compact disk housing having means for receiving said resilient clasp element so that said resilient clasp element can hold said compact disk housing and said compact disk housing is provided with a recess positioned for engagement with said latching element when said compact disk housing is held on said slider member in said storage position.

4. A storage device according to claim 2, wherein each of the recording medium housings comprises a magnetic tape cassette housing having means for receiving resilient clasp element so that said resilient clasp element can hold said magnetic tape cassette housing and said magnetic tape cassette housing is provided with a recess positioned for engagement with said latching element when said magnetic tape cassette housing is held on said slider member in said storage position.

5. A storage device according to claim 1, wherein said release element comprises a lug extending from said slider member associated with said locking means.

6. Storage device for recording media contained in recording medium housings, said storage device comprising a storage device housing having a front panel provided with at least one storage device housing opening through which a recording medium housing containing recording medium is insertable into and removable from said storage device housing,
   a slider member provided in said storage device housing for each of said storage device housing openings and wherein said slider member has means for receiving, holding and carrying one of said recording medium housings, each of said slider members being spring-loaded so as to be urged from a storage position in said housing to an unloading position in said housing and each of said slider members being contained completely within said storage device housing in said unloading position;

locking means associated with each of said slider members for engaging and holding one of said recording medium housings on said slider member associated therewith in said storage position when said slider member is holding one of said recording medium housings; and unlocking means associated with each of said locking means for releasing said locking means when said slider member associated with said locking means is in said storage position so that said slider member can move from said storage position to said unloading position contained within said housing.

7. Storage device according to claim 6, wherein each of said locking means includes a resilient blade attached to said storage device housing and having a free end and an upwardly protruding latching element at said free end, said resilient blade being positioned so that said latching element is engageable in a recess provided in one of said recording medium housings when said recording medium housing is held by said slider member associated with said locking means and said slider member is in said storage position; and each of said unlocking means comprises a release element extending from said slider member associated with said locking means toward said storage device housing opening and positioned, so that said release element holds said resilient blade away from said recording medium housing at least over a portion of a motion path of said slider member between said storage position and said unloading position so that said latching element is not engaged with said recording medium housing; a resilient wire having one end connected to said latching element and another end connected to said storage device housing; and a pushbutton mounted slidably in said storage device housing and having an inclined surface pressing against said resilient wire when said pushbutton is pushed so as to hold said latching element out of engagement with said recess in said recording medium housing when said slider member holding said recording medium housing is in said storage position, so that said slider member holding said recording medium housing can move from said storage position to said unloading position.

* * * * *